United States Patent
Sylvester et al.

(10) Patent No.: US 9,111,534 B1
(45) Date of Patent: Aug. 18, 2015

(54) CREATION OF SPOKEN NEWS PROGRAMS

(71) Applicant: Google Inc., Mountain View, CA (US)

(72) Inventors: Michael A. Sylvester, Merseyside (GB); Javier Gonzalvo Fructuoso, London (GB)

(73) Assignee: Google Inc., Mountain View, CA (US)

( * ) Notice: Subject to any disclaimer, the term of this patent is extended or adjusted under 35 U.S.C. 154(b) by 282 days.

(21) Appl. No.: 13/830,703

(22) Filed: Mar. 14, 2013

(51) Int. Cl.
*G10L 13/08* (2013.01)

(52) U.S. Cl.
CPC ....................................... *G10L 13/08* (2013.01)

(58) Field of Classification Search
CPC .............. G06Q 30/02; G06Q 30/0273; G06Q 30/0241; G06Q 30/0269; G06Q 30/0251; G06Q 30/0255; G06Q 30/0207; G06Q 30/0271; G06Q 30/0277; G06Q 30/0272; G06F 17/30867; G06F 17/30761; G06F 17/30035
USPC ............ 704/1–10, 258, 260, 270, 270.1, 251, 704/255, 257; 705/14.45, 14.57; 709/204, 709/231, 217; 725/42
See application file for complete search history.

(56) References Cited

U.S. PATENT DOCUMENTS

| | | | |
|---|---|---|---|
| 6,094,671 A | 7/2000 | Chase et al. | |
| 8,108,378 B2 | 1/2012 | Ott, IV et al. | |
| 8,291,453 B2 * | 10/2012 | Boortz | 725/42 |
| 8,438,485 B2 | 5/2013 | Kulis et al. | |
| 2006/0218294 A1 * | 9/2006 | Rosenberg | 709/231 |
| 2007/0050184 A1 * | 3/2007 | Drucker et al. | 704/3 |
| 2007/0078712 A1 | 4/2007 | Ott, IV et al. | |
| 2008/0046948 A1 | 2/2008 | Verosub | |
| 2008/0077679 A1 | 3/2008 | Bawany et al. | |
| 2008/0091796 A1 * | 4/2008 | Story et al. | 709/217 |
| 2008/0189099 A1 * | 8/2008 | Friedman et al. | 704/8 |
| 2010/0023395 A1 * | 1/2010 | Bugenhagen | 705/14.45 |
| 2012/0253814 A1 * | 10/2012 | Wang et al. | 704/260 |
| 2013/0080526 A1 * | 3/2013 | Gill et al. | 709/204 |
| 2014/0188613 A1 * | 7/2014 | Manchiraju | 705/14.57 |

FOREIGN PATENT DOCUMENTS

EP   0 746 908   12/2004

* cited by examiner

*Primary Examiner* — Huyen Vo
(74) *Attorney, Agent, or Firm* — Fish & Richardson P.C.

(57) ABSTRACT

Implementations related to system and techniques for providing audio news reports are discussed. A computer-implemented method includes identifying, with a computer system, one or more news preferences for a first user, selecting a plurality of news stories, wherein particular ones of the new stories are determined to be responsive to the news preferences for the first user and comprise audio versions of stories converted automatically from textual news stories, assembling, with the computer system and for the first user, an audio news report that includes the audio versions of the selected news stories, and delivering, to a computing device, the assembled audio news report.

18 Claims, 8 Drawing Sheets

CREATION OF SPOKEN NEWS PROGRAMS

TECHNICAL FIELD

This document generally relates to the generation and delivery of spoken news to a computing device, such as a mobile computing device.

BACKGROUND

Users of mobile computing devices, such as smart phones, other types of cellular telephones, tablet computing devices, and personal digital assistants (PDAs), access large amounts of content available over networks, such as the Internet. In many instances, users of mobile devices access news stories and other informational content provided by one or more content providers (e.g., a newspaper web site), such as in the form of material that can be displayed on a computing device and read by a user. In some situations, users can receive audio podcasts that are created by respective content providers, and that may include various forms of related content that is organized into a program that may be, for example, a half-hour or hour long. For example, a talk radio station may create one or podcasts of the station's radio shows that can be listened to by users of the mobile computing devices.

SUMMARY

This document generally describes generating spoken news reports from textual news stories that are converted into a spoken form by automatic speech-to-text conversion and are assembled into reports that each include multiple stories, and also include audio advertisements and other transitional material between stories (e.g., audio that introduces a particular story or a section of a news report). For instance, one or more textual news stories may be automatically converted to audio versions. These audio versions may then be combined with advertisements or other audio transitions that are based on the contents of the news stories to create the spoken news report. A system may be configured to determine the type of news report to generate based on a predefined user profile, a determined geographic area, explicit identification of similar stories by the user, and by other techniques, and may select and assemble audio versions of stories that match such considerations.

In one aspect, a computer-implemented method includes identifying, with a computer system, one or more news preferences for a first user, selecting a plurality of news stories, wherein particular ones of the new stories are determined to be responsive to the news preferences for the first user and comprise audio versions of stories converted automatically from textual news stories, assembling, with the computer system and for the first user, an audio news report that includes the audio versions of the selected news stories, and delivering, to a computing device, the assembled audio news report.

Implementations can include any, all, or none of the following features. The method can include selecting one or more items of promotional information, the items of promotional information being in an audio format and that are select to correspond to topics of the selected news stories, to preferences of the first user, or both and selecting, for at least one of the selected news stories, one or more natural language prompts that play audio as part of the audio news report separate from the news stories, wherein the assembled audio news report further includes the selected items of promotional information and the selected natural language prompts. Identifying the news preferences can include accessing a user profile of the first user, the user profile including a combination of news topics and news providers preselected by the first user and using the preselected news topics and news providers to identify the one or more news preferences for the first user. The user profile can include information that corresponds to activities performed by the first user on one or more social networks and identifying news preferences can include using the information to determine one or more news preferences for the first user. The user profile can include information that corresponds to activities performed by users other than the first user on one or more social networks and identifying news preferences can include using the information to determine one or more news preferences for the first user.

Selecting the one or more items of promotional information can include generating search results for a search query that includes text that is determined to correspond to one or more titles of the selected news stories, identifying one or more items of promotional information from the results of executing the search query and previously provided bidding information provided by an advertiser, and in response, using the one or more identified items of promotional information as the selected items of promotional information. Selecting the one or more items of promotional information can include determining the content of at least one of the news stories, identifying one or more items of promotional information based on a similarity between the content of the news stories and the content of the items of promotional information, and in response, using the one or more identified items of promotional information as the selected items of promotional information. Selecting one or more natural language prompts can include determining the absence, for at least one of the selected news stories, of an audio version of a natural language prompt stored on a computer-readable storage device, generating one or more text prompts that correspond to the audio version, providing the text transitions to a text-to-speech converter for conversion into respective audio formats, storing the respective audio formats on the computer-readable storage device, and in response, using the respective audio formats as the selected natural language prompts. Selecting one or more natural language prompts can include detecting, for at least one of the selected news stories, the presence of one or more audio versions stored on a computer-readable storage device, where the audio versions correspond to the one or more natural language prompts, retrieving the detected audio versions from the computer-readable storage device, and in response, using the retrieved audio versions as the selected natural language prompts. The selected natural language prompts can be arranged within the audio news report to signal a transition between at least one of the selected news stories. The assembled news report can include audio that corresponds to spoken news retrieved from a news provider. The one or more items of promotional information can be presented with user-selectable content that causes an application that is executed on the mobile device to present additional information about the items of promotional information.

The method of claim can further include accessing agreement information that corresponds to agreements entered into by each owner of a news story in the plurality of news stories, wherein selecting a plurality of news stories further comprises preventing one or more news stories from being selected based on the agreement information. The agreement information can include at least one of a revenue sharing requirement, an article modification requirement, an attribution of source requirement, and click-through behavior for the one or more items of promotional information. Selecting the plurality of news stories can be influenced by the geographic location of the first user. A length of the audio news report can be selected to correspond to the news preferences for the first user.

In a second aspect, one or more machine-readable tangible storage devices storing instructions that, when executed by one or more computer processors, perform operations including receiving, on a computing device, an audio news report that includes one or more audio news stories that have been automatically converted from respective text versions, presenting, on a display device of the computing device, user-selectable controls that control the playback of the audio news report, and presenting, on the display device, information particular to each of the news stories included in the audio news report as each news story is played.

Implementations can include any, all, or none of the following features Presenting information particular to each of the news stories can include identifying a title for each of the news stories in the audio news report, generating user-selectable links that correspond to the titles of each of the news stories, where the user-selectable links present the user with information about the source of the news story upon selection, and presenting the user-selectable links. Receiving the audio news report can be in response to receiving a user-initiated request for the audio news report, generating an audio news report request, and transmitting the audio news report request to a server system.

In a third aspect, a system includes one or more processors, a user profile repository that stores a plurality of user profiles, where each user profile in the plurality of user profiles includes one or more news preferences, a content service is programmed to select one or more news stories for a first user, where the selected news stories are responsive to the news preferences included in a user profile in the plurality of the user profiles for the first user, a text-to-speech converter that is programmed to automatically convert the selected news stories into a respective audio version, an audio assembler that is programmed to assemble an audio news report for the first user that includes the audio versions of the selected news stories, and a delivery interface that is programmed to deliver the audio news report to a mobile device operated by the first user.

Certain implementations can provide one or more advantages. For example, a user can receive and listen to a generated spoken news report at a time when reading the news would be inconvenient or otherwise dangerous (e.g., driving). In another example, spoken news reports may be generated using news sources that may not normally be accessed by the user, expanding the amount of information to which the user is exposed. In yet another example, one or more spoken news reports can be generated at one or more pre-specified times a day with little user effort. In yet another example, advertisements and other audio transitions may be better targeted to a user's interests, which can improve both the overall user experience and revenue generating capabilities of a system using the techniques described here.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
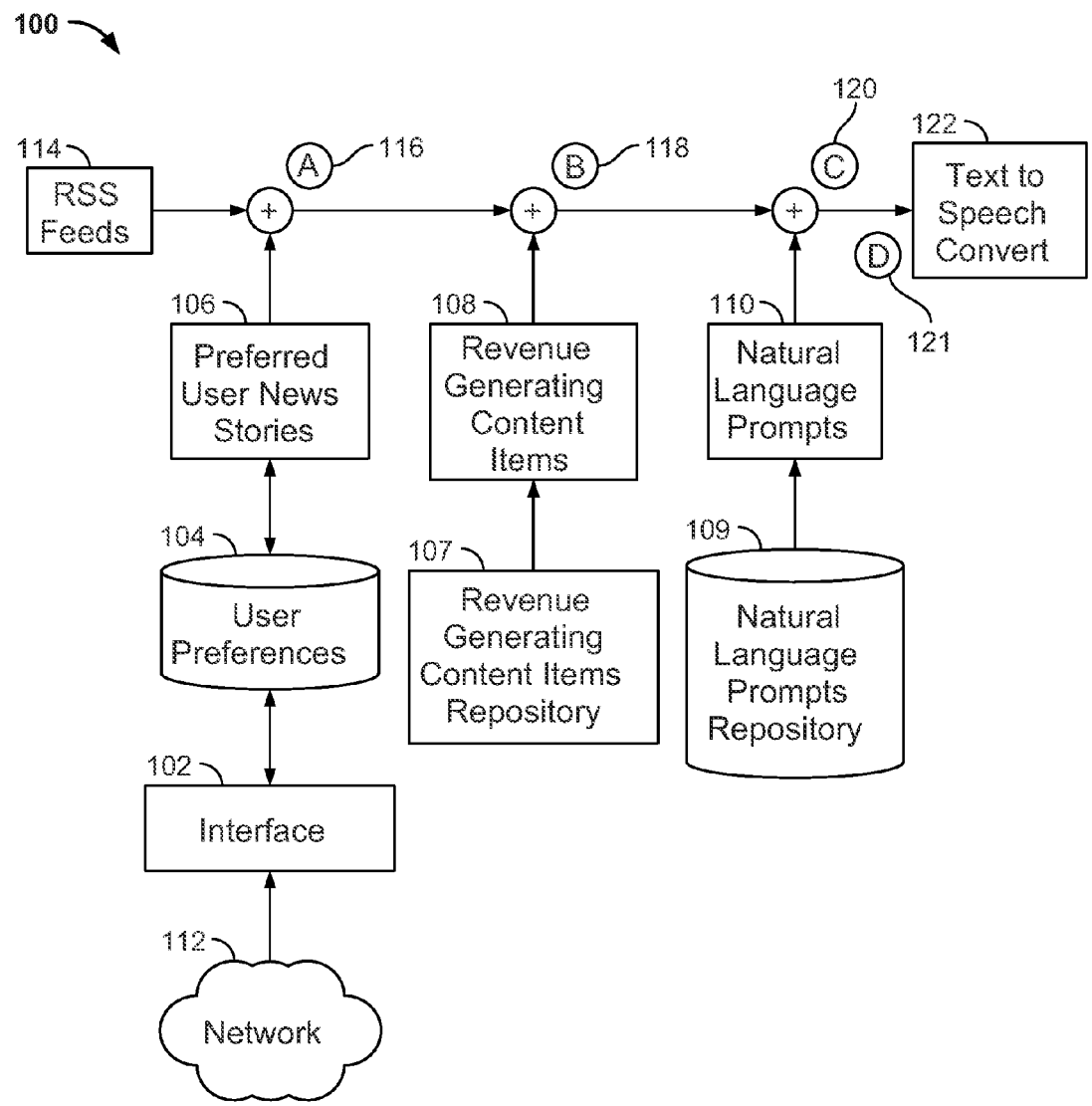
FIG. 1A shows a conceptual view of an example system that can used to generate audio news reports.

This document is generally directed to systems and techniques for automatically producing, and delivering to various computing devices, an audio news report that is generated from written news reports that have been converted to speech, and have been supplemented with advertisements and other bumper (or transitional) material. In identifying news stories that are available for inclusion in the audio news report, the systems and techniques may first determine what rights are available in the various stories (e.g., whether an operator of the service has a license from the creator of particular stories). The selected stories to be provided to a particular user may also be based on a determined profile for the user, such as by determining that the user is in a particular geographic area (so as to select news stories for that area), and whether the user has shown an interest in particular topics (e.g., by explicitly identifying such a topic in a user profile or implicitly showing an interest by listening to stories of the particular topic rather than skipping them). In one example, the user may be allowed to configure one or more privacy settings. Such privacy settings may restrict the amount of data that the systems obtain about the user's activities. For example, the user can prevent the systems from capturing data about the user's activities that is used to select one or more of the stories.

The advertisements may be selected to be relevant to particular news stories, to a particular user, or both. For example, the textual story from which an audio version of the story was generated may be submitted to a topical analyzing for analyses to determine keywords related to the story, and those keywords may be used to select advertisements to be played before or after the story is played (e.g., as part of a podcast that includes a number of stories). Alternatively, an on-line advertising system may have already analyzed a web page associated with the story and selected a key word or key words, and the systems described here may submit a URL for the page on which the article was published in order to obtain keywords from such another system.

Other "bumper" materials, in addition to audio advertisements, may be provided before, after, or between the particular stories in an assembled audio newscast. For example, a table of contents that lists all the sections (e.g., news, sports, business, etc.) in a newscast may be provided at the beginning the newscast, and may be filled with the title of the different stories (which may be identified by analyzing the hypertext markup language (HTML) code for pages on which the textual stories were located, e.g., by using text identified by a Title tag). A portable media device may be programmed to allow a user to jump to a particular story or section of a newscast, upon the user actuating a control on the device while the device is calling out the particular story or section.

Also, spoken prompts may be added between stories and around the audio advertisements as is appropriate, such as to announce the transition to a new section in a newscast—e.g., "and now, the sports."

FIG. 1A shows a conceptual view of an example system 100 that can used to generate audio news reports (where a news report includes a plurality of news stories joined together in a single file or stream, potentially along with other audio information). In general, the system 100 includes structural components arranged and connected to convert written news stories to spoken form automatically, and to select particular ones of such stories for particular users based on explicit or implicit preferences of each of the particular users. As such, each user may be provided with a unique audio news program made up at least in part from news stories that were created in textual form.

The example system 100 includes an interface 102 and a user preferences repository 104. The user preferences repository 104 can be used to identify one or more preferred user news stories 106 that the system 100 has determined to be preferred by particular users. The stories themselves may be stored separately (either as text, audio, or both in a manner that each textual story is linked to a corresponding spoken version of the story) and accessible to a variety of users, while pointers or flags to particular stories for particular users are stored in the repository 104 or can be generated from user preferences identified for particular users in the repository 104. The system 100 also includes a revenue-generating-content items repository 107 that can be used to select one or more items of revenue-generating-content 108 (e.g., advertisements). The system 100 also includes a natural language prompts repository 109 that can be used to select on or more natural language prompts 110. Each of the preferred user news stories 106, the items of revenue-generating-content 108, and the natural language prompts 110 can be sent to a text-to speech converter 122 to be converted from a textual version to an audio (or spoken) version. The system 100 can also communicate with one or more other computing devices using network 112.

The interface 102 can be any of a variety of appropriate interfaces through which the system 100 can communicate with the network 112 and other computing devices connected to the network 112. For example, the interface 102 can be a combination of software, firmware, and hardware (e.g., one or more layers in the ISO 7-layer network stack) including, but not limited to, an application that can be used by a user to set one or more user preferences that can be stored in the user preferences repository 104. In one example, the interface is an interactive HTML-based application and service. The interface 102 is described in more detail below.

The user preferences repository 104 can include one or more user-configurable settings that can be used to control the manner in which the system 100 determines the news stories to include when generating an audio news report. Preferences for a particular user may be identified from explicit and implicit user interaction with the system 100. Explicit interaction may occur by the user selecting topics or categories (e.g., in a user profile) that interest them, such as politics, sports, and technology. In one such example, a user can communicate with the system 100 by way of a computing device that comminutes over the network 112 and interacts with the interface 102 to select one or more particular topics of interest, which can be stored in the user preferences repository 104. Implicit inputs from a user may occur without the user explicitly identifying a topic, but by observation of a user's actions with respect to a computing device, with appropriate controls present for the user to affect the type and amount of information that is identified. As one such example, a user's geographic area can be stored in the user preferences repository 104 (e.g., when the user creates a user profile). The geographic location can be used when determining which news stories to include when generating an audio news report for the particular user.

As yet another example, the user preferences repository 104 can store a user-preferred length of the generated audio news report. For example, a user can specify a preferred length in time (e.g., a number of minutes including 5, 10, 20, 45, and 90 minute lengths) or a preferred number of articles (e.g., three). Such preference may be made explicitly (e.g., by the user choosing a number in a profile) or implicitly (e.g., by a system 100 observing that the user never listens to more than x minutes of a news report that is generated for her). In one example, the total length (in minutes) can be computed by the system 100 by multiplying a known word-per-minute rate of audio generated by the text-to-speech converter with the number of words in the text versions of the preferred user news stories, the revenue-generating-content items 108, and the natural language prompts 110 to be included in the audio news report. In another example, audio files that have been created form text sources can have their lengths stored as meta data that is associated with them by the system 100, and stories and related bumper audio may be selected to make a program a length that approximately matches the user's desired length.

Such specified or identified length may then be used, when a system builds a newscast, by affecting the number of topics, news articles, and other segments the system selects for the newscast, or in the particular articles that are selected. For example, if a user specifies a 10 minute newscast, or if the system determines that the user only listens to 10 minutes of a provided daily newscast, the system can either truncate the number of topics in the newscast and select only stories for the topics the user has indicated as being most important. Alternatively, or in addition, the system can select relatively short articles (e.g., low word count) or can avoid selecting a lengthy article (e.g., a piece of investigative journalism) that it would otherwise select if the user was indicated as being open to a longer newscast.

In addition, one or more of the user-configurable settings can be grouped into a package and stored in the user preferences repository 104. For example, a user can select a first collection of topics of interest for a first package (e.g., "weather" and "traffic" topics) and second collection of topics of interest for a second package (e.g., "sports," and "entertainment," and "traffic" topics). The user can also associate a time of day and a unique name with a particular package. For example, the user can associate a 6 am-9 am time period with the first package and provide a name 'morning' that will be associated with the first package. Similarly, the user can associate a 4 pm-7 pm time period with the second package and provide a name "evening" to be associated with the second package. Thereafter, the system 100 can generate different audio news reports for different times of the day according to the user's preferences and identify these audio news reports to the user based on the user provided unique identifier. The generation of the reports may also be timed to occur at a time associated with the time identified by the user, such as by creating the "morning" news feed at Preferred user news stories 106 can include one or more text stories that are responsive to one or more of the user preferences that are stored in the user preferences repository 104 for a particular user. For example, if a user selects "sports," "politics," and "money" as topics of interest, then the preferred user news stories 106 may be limited to those three topics by the system 100 (although other user preferences stored in the user preferences repository 104 may affect which news stories are determined to be preferred user news stories 106). As another example, if a particular user lives in Minnesota, some or all of the determined preferred user news stories 106 may be limited to a geographic area that includes Minnesota and possibly other portions of other geographic areas (e.g., some of Canada, Wisconsin, Iowa, North Dakota, or South Dakota depending on the particular user's location within the state of Minnesota). Although labeled here as "preferred" stories, the stories 106 may be connected to user preferences in various manners, and need not be stored in a manner that any particular story is identified as being "preferred" to a particular user. For example, a system may identify all news stories to which it has access to convert to spoken form, and may convert those stories and make those stories the system's entire library of stories (though stories can be added and removed based on timing so that only current news stories are included as candidates, where "current" can be affected both by their age and their popularity so that popular stories will be maintained as "current" longer than unpopular stories). That general group of stories may then be pointed to when a news program is to be generated for a user, and may be added one-by-one to a news stream or file for the particular user. Thus, there may never be any stored story that is "preferred" for a particular user or users, but the stories may be stored more generally, and selected as preferred stories only at the time their audio is added to a program for a user.

The revenue-generating-content items repository 107 can include one or more items of revenue-generating-content (e.g., advertisements). These advertisements can include both text advertisements and audio advertisements. In one example, the revenue-generating-content items repository 107 can first store a text version of the advertisement. At some future time, the system 100 can convert the text version to a respective audio version (e.g. using the text-to-speech converter 122). The converted audio version of the advertisement can also be stored in the revenue-generating-content items repository 107 for future use by the system 100. As another example, the revenue-generating-content items repository 107 can receive audio advertisements from revenue-generating-content providers and store the audio advertisements in the revenue-generating-content items repository 107 without converting the audio advertisements using the text-to-speech converter 122. Audio submitted by advertisers can be associated with text or graphics from the advertisers, so that a screen of a computing device may display the text or graphics while the audio advertisement is being played. Other meta data may also be provided by or for an advertiser, such as interaction meta data that allows a user of a computing device to interact with an advertisement—e.g., to select a control on the computing device to be taken to a web page for the advertiser (including to review the web page while the audio program continues to play) or for click-to-call interaction that causes the computing device to dial a telephone number identified by the advertiser (and to pause the news program while the user is employing the telephone functionality of the device).

The system 100 can select one or more revenue-generating-content items 108 that are responsive to either one or more of the user preferences stored in the user preferences repository 104 for a particular user, or to at least one of the preferred user news stories 106, or a combination of both. In one example, if one of the preferred user news stories 106 is a story about a local sports team (e.g., based on at least one of the user preferences stored in the user preferences repository 104 for a particular user), one of the revenue-generating-content items 108 selected by the system 100 may be an advertisement for a ticket promotion for the local sports team. The story may be identified as being sport-related based on analysis of text in the story, headers associated with the story, or web site analysis that shows the story was presented in a "sports" section of a web site. A key word or topic for a story may be identified by the system 100 by providing a URL for the written version of the story to a system that performs topic analysis on various web pages (e.g., an advertising system that analyzes pages for purposes of selecting advertisements to be displayed on the pages). As another example, if a national exhibit was touring in a particular geographic area, one of the revenue-generating-content items 108 may be an advertisement for the exhibit, if the user is within that particular geographic area. The exhibitor, as an advertiser, may have selected the particular geographic area as a topic for the advertisement. The advertiser may also have selected a topic like "science," thereby causing the advertisement to be more likely selected for playing in a news program that includes a "science" segment.

The natural language prompts repository 109 can include one or more natural language prompts (e.g., "breaking news," "and now the sports," or "this story is brought to you by."), which may serve as additional "bumpers" between segments of a spoken news program. In one example, the natural language prompts repository 109 can first store a text version of the natural language prompt. At some future time, the system 100 can convert the text version to a respective audio version (e.g., using text-to-speech converter 122). In another example, the bumper information can be provided initially in spoken form.

As another example, the natural language prompts repository 109 may not include either the text version or the audio version of a particular natural language prompt. For example, the system may determine that a natural language prompt should be added at the beginning of the audio news report that includes the name of the user. But for some reason (e.g., because the name is unique) the system 100 may not have access to that particular natural language prompt at a time the system 100 is creating the audio news report. Under those circumstances, the system 100 may determine the absence, for at least one of the selected news stories, of an audio version of a natural language prompt stored in the natural language prompt repository 109.

In response, the system can generate one or more text prompts that corresponds to the audio version. That is, because the system 100 knows the name of the user (e.g., from the user preferences), and can use that name stored in the user preferences as the text prompt that corresponds to the audio version, once the system 100 has created the one or more text prompts, the system 100 can provide the text prompts to the text-to-speech converter 122 for conversion into respective audio versions. The system 100 may also store the respective audio versions on the computer-readable storage device so that the converted audio version is available for future use by the system 100. For example, the system 100 can detect the presence of an audio version of a natural language prompt and use the audio version instead of providing the natural language prompt to the text-to-speech converter.

The system 100 can select one or more natural language prompts 110 that are responsive to either one or more of the user preferences stored in the user preferences repository 104 for a particular user, or that are responsive to at least one of the preferred user news stories 106. In one example, if one of the preferred user news stories 106 was a story about the local sports team, one of the natural language prompts selected by the system 100 may be "and now the sports." As another example, instead of a lead-in natural language prompt (e.g., "and now the sports"), the selected natural language prompt 110 may be a lead-out natural language prompt (e.g., "that was Samuel reporting on the weather"). As yet another example, if a particular user's name is "Dave" (as stored in the user preferences repository 104), one of the natural language prompts 110 selected by the system may be "hello Dave," or "here are your news stories, Dave."

The network 112 can include one or more communication networks that allow for electronic communication between at least two computing devices. Examples include the Internet, a local area network (LAN), a wide area network (WAN), a virtual private network (VPN), a wireless network (e.g., WiFi, cellular telephone network, 3G/4G data network, etc.), or any combination thereof.

As one example, the system 100 of FIG. 1A can be used to generate an audio news report as follows. Initially, the system 100 may receive one or more rich site summary (also known as real simple syndication) (RSS) feeds 114 using a traditional RSS feed reader (not shown) to index available news stories. The RSS feeds 114 may include any appropriate number of pieces of published content or any appropriate number of updates to previously-published content that are being offered by one or more news content providers (e.g., newspapers, magazines, blogs, and other news content providers). In one example, these RSS feeds correspond to content being offered by publically available news sources (e.g., various web pages). In another example, subscription-based RSS feeds may be received if, for example, a particular user has paid for a subscription for particular news content. In one example, each RSS feed 114 can include at least some text of the published article as well as metadata that may include, for example, the author of the article and the publication date. A user may be allowed to provide different user preferences for the different RSS feed structures, where such preferences may be matched to meta data that is associated with various of the RSS feeds. For example, some RSS feeds include "hot stories," while others do not. If, for example, a user selects a news content provider that provides an RSS feed that includes "hot stories," the system 100 may provide additional configuration parameters to the user that when selected allow the user to specify if and/or when the "hot stories" from that particular news content provider should be included in the preferred user news stories 106. In other words, these RSS feeds 114 can define the universe of news stories available to the system 100 (and, by extension, to a user of the system 100).

In step A 116, the system 100 selects one or more preferred user news stories 106. In one example, the system 100 may select the preferred user news stories 106 by accessing the user preferences repository 104 and comparing user preferences for a particular user to the news sources available in the RSS feeds. For example, if a user selects "sports," "politics," and "money" as topics of interest and a received RSS feed 114 includes articles directed to "video games," "science," and "money" the system 100 may select one or more articles about "money" as the preferred user news stories 106. As another example, the system 100 may compare keywords for a user, e.g., "Chicago Bulls" to topics returned by a system that analyzes the text versions of the stories to identify topics in those stories, e.g., a story that talks about a recent trade made by the Chicago Bulls.

In step B 118, the system 100 selects one or more revenue-generating-content items 108 from the revenue-generating-content items repository 107. In one example, the system 100 may select the revenue-generating-content items 108 by comparing content items in the revenue-generating-content items repository 108 with the content of at least one of the preferred user news stories. For example, if one of the preferred user news stories is a story about the stock market, an advertisement directed to a brokerage house may be selected as one of the revenue-generating-content items 108. The system 100 may also select content items by external reference to a separate sub-system, much in the manner that text advertisements are provided to portions of web pages as those pages are rendered by a web browser.

In step C 120, the system 100 selects one or more natural language prompts 110 from the natural language prompt repository 109. In one example, the system 100 may select the natural language prompts 110 by comparing prompts in the natural language prompts repository 109 with the content of at least one of the preferred user news stories. For example, if one of the preferred user news stories is a story about the stock market, a natural language prompt "here is the latest stock market news" may be selected as one of the natural language prompts 110.

In step D 121, the system 100 may combine the preferred user news stories 106, the selected revenue-generating-content items 108 and the selected natural language prompts 110 into a news report and send the report to a text-to-speech converter 122. The text-to-speech converter 122 can be any appropriate text-to-speech converter that automatically converts received text into respective audio versions of that text. In one example, the system 100 may also provide some additional information, including the speed at which portions of the text are to be spoken and proper emphasis on particular words to create more natural sounding audio. In response, the text-to-speech converter 122 can convert the combination of the selected revenue-generating-content items 108 and the selected natural language prompts 110 into a respective audio version. In addition, the language of the spoken news may differ from the language of the written news. For example, a user having an IP address in the U.S. or has explicitly indicated that English is his spoken language may be interested in news about France. In such a situation, the system 100 may identify news stories that were printed in French (in addition to stories printed in English or other languages) and may convert and translate the stories in one operation—e.g., by converting the French-language typed story into an intermediate English text file, and then converting that intermediate file into spoken English.

While shown and described here as a selection of each of the relevant parts of a program followed by assembly of the program, the process may equally occur by stepping through each component of a program, and selecting the relevant component at that time. For example, a process may initially select a natural language introduction, then select a natural language label for the first section of news (e.g., "Now the breaking national news"), then a first news story and perhaps one or more additional new stories, then an advertisement, then a introduction to a separate topic, and so on.

In one example, the system 100 can perform at least some of the above techniques continuously. For example, the system 100 can perform the indexing of news stories by processing RSS feeds 114 and can convert those stories using the text-to-speech converter 122 on an on-going basis—without regard to any particular users who might have those stories requested for them. That is, the system 100 may be continually finding, indexing, and converting text versions of news stories to spoken versions. Upon receiving requests for news programs on behalf of particular users of the system, the system 100 may access the already-created audio versions of those news stories to build an audio news report for those users (e.g., upon a request made by a user, or at a predetermined time of day).

In this manner then, the system 100 provides convenient and automated techniques for generating news programs to which various different users can listen. The programs may be customized for particular users or groups of users based on the preferences of such users and delivered upon demand from particular ones of such users or at predetermined automatically-triggered times, such as in the early morning for news reports that a user is likely to listen to in the morning (e.g., during a morning commute). Such a report can be supplemented with non-news story content, such as advertisements and other bumper materials such as spoken introductions and transitions, so as to provide a professionally-formatted audio newscast. Such a newscast may be downloaded automatically to a media player of the user (e.g., a smartphone with a media player application on it) so that the user can listen to the newscast in a convenient manner.

Figure 1B:
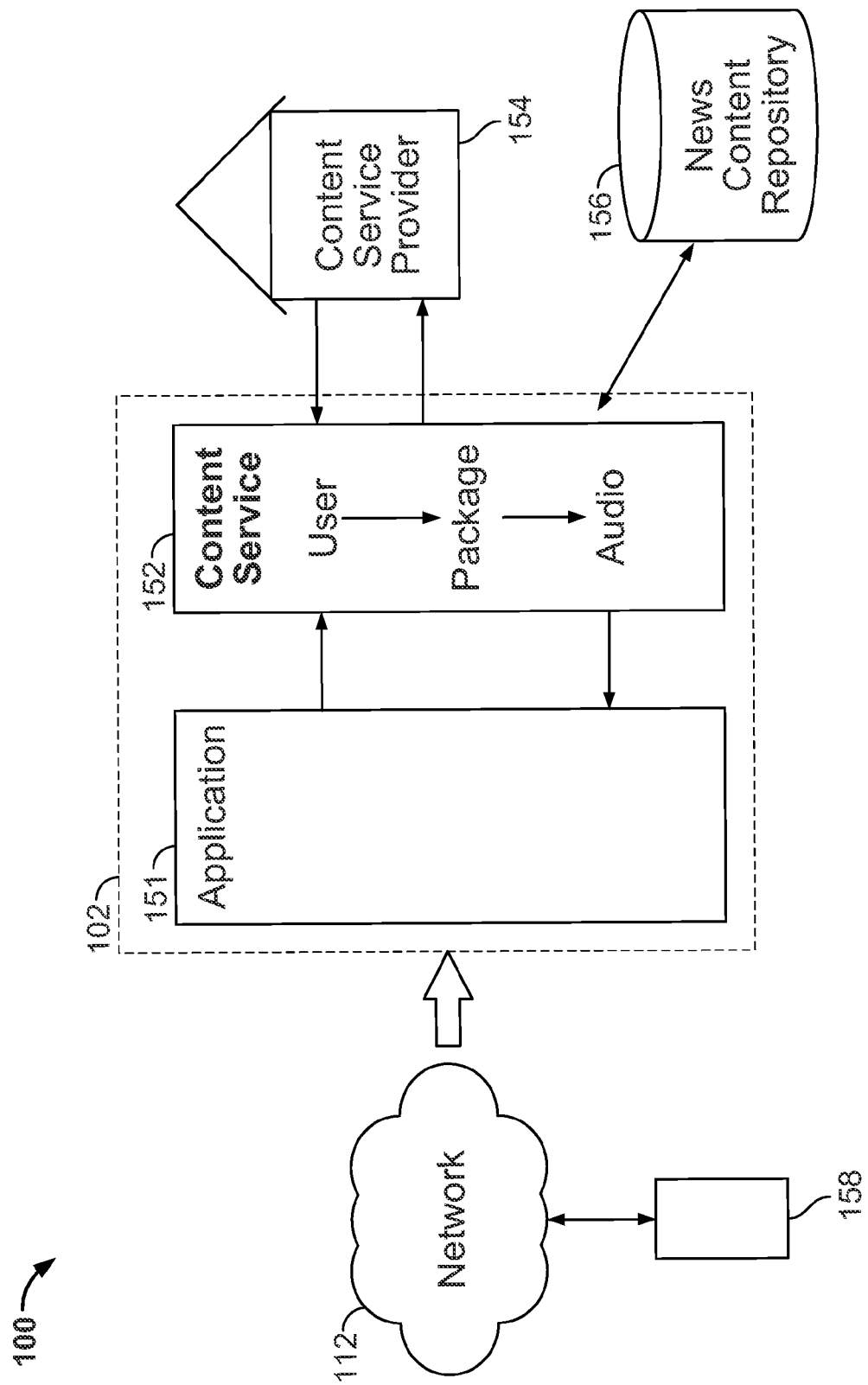
FIG. 1B shows another conceptual view of the example system that can be used to generate audio news reports.

FIG. 1B shows another conceptual view of the example system 100 that can be used to generate audio news reports. As shown here, the system 100 works with an application 151 that executes on a computing device 158 to manage the downloading and playing of media programs, including newscast, for a user of the computing device 158.

In this implementation, the system 100 includes the interface 102, which includes an application 151 and a content service 152. The system 100 also includes the network 112, a content service provider 154, a news content repository 156, and a computing device 158.

The computing device 158 can present audio news reports received from the system 100. In some implementations, the audio news reports can be received in response to a request sent by the computing device 158. For example, in some the system 100 can alert the computing device 158 when one or more new audio news reports are available, and the computing device 158 can request one or more of the new audio news reports. In some implementations, the audio news reports can be received automatically at a predetermined interval or a predetermined time. The computing device 158 can be a laptop, desktop, or mobile computing device such as a smart phone. A user can use the computing device 158 to interact with the interface 102 over the network 112. In one example, the user can use the computing device 158 to either log-in (if they are a returning user) or register (if they are a new user) to an application, such as application 151 to receive one or more audio news reports (e.g., provided by content service provider 154). Once the user has logged-in or registered, the system may allow the user to configure one or more user preferences that specify the types of audio news reports that the users wishes to receive.

The application 151 can manage incoming and outgoing data requests, as part of a process of building newscasts for various users. In one example, the application 151 is an application that executes within a web browser on the computing device 158. For example, the application 151 can receive a request that includes a package name (e.g., "morning") and an article at which the user left off (if for example that the user was previously unable to listen to the entire audio news report). The application 151 can communicate this information to the content service 152. In response, the content service 152 can provide an audio news report to the application 151 that satisfies the request from the application. The application 151 can then play the news report itself or deliver the provided audio news report to an application executing on the computing device 158 (e.g., in a web browser or other, standalone application).

The application 151 may also control how information about a user is employed by the system 100. For example, the application 151 may alert the user that data provided to the application 151 and information concerning activities performed by the user when using the application 151 may be used when the system 100 selects at least some of the news stories, the revenue-generating-content items, and the natural language prompts to provide to the user. In one example, the application 151 may allow the user to alter his or her privacy settings to limit or otherwise prevent the system 100 from using data concerning the user's activities when the system selects 100 the news stories, the advertisements, and the natural language prompts to provide to the user.

The application 151 may also manage new users and provide terms of use to the users. For example, the application 151 may provide one or more service agreements when a user uses the application 151, either at the time when news reports are delivered or when a user first sets up preferences with the application 151. In one example, if the user is a new user, the application 151 may present an end-user licensing agreement and terms of use before the user is allowed to configure their user preferences (e.g., by selecting a user interface component of the application, such as an "I Accept" button).

The content service 152 can manage the audio news reports by automatically selecting one or more text news stories from RSS feeds (or audio news stories already stored in the news content repository 156) based on the user preferences selected by a user using the application 151. In one example, the content service 152 can create audio news reports by selecting one or more text news stories that are responsive to the user's preferences and submitting the one or more selected news stories to a text-to-speech converter (such as text-to-speech converter shown in FIG. 1A). In another example, the content service 152 can create the audio news reports by locating audio versions of the selected text news stories (e.g., that are stored in the news content repository 156).

The content service provider 154 provides stories to the content service 152. It can include any of an appropriate variety of computer systems and/or computing devices that communicate content over the network 112 using content service 152. For example, the content provider 154 can be computer systems hosting web sites and that serve content (e.g., web pages and associated information) associated with the web sites, such as news web sites, blogs, magazine web sites, news media outlet web sites and/or other web sites. In another example, the content providers 154 can distribute content to applications, such as a spoken news application running on the mobile device 158.

The news content repository 156 can store a plurality of written news articles and their respective audio versions. In one example, the news content repository 156 can store both articles in a text version and respective audio versions. For example, the system 100 can index RSS feeds 114, retrieve articles in a text version that are specified in the RSS feeds 114 and convert the articles in a text version into respective audio versions, and the news content repository may store and cross-correlate such versions of content.

Figure 2:
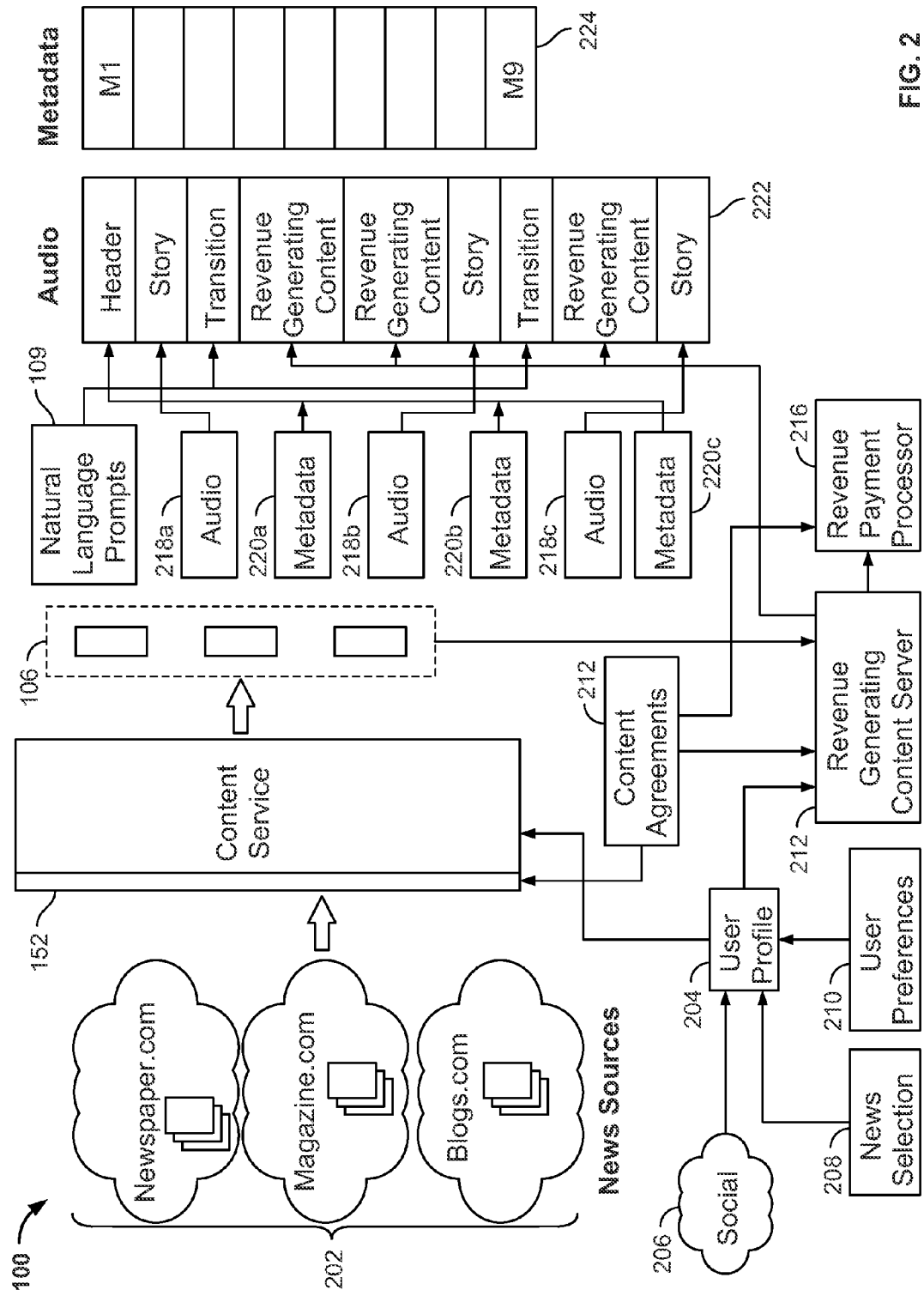
FIG. 2 shows another conceptual view of the example system that can be used to generate audio news reports.

FIG. 2 shows another conceptual view of the example system 100 that can be used to generate audio news reports. This figure generally shows how the system 100 may interact with restrictions on use of content that are imposed by publishers of the content, and how the system 100 can share revenue in appropriate circumstances with such publishers. For example, publishers may grant an operator of the system 100 the right to convert textual news stories to spoken news stories, and may in exchange receive a share of advertising revenue derived from the playing of advertisements in programs into which the news stories are incorporated.

In one example, the system 100 can provide, to a content service 152, a user profile 204 and content agreements that are stored in the content agreements repository 212. The content agreements can include a revenue sharing requirement for the revenue-generating-content items, an article modification requirement, an attribution of source requirement, and click-through behavior for the one or more revenue-generating-content items.

The content service 152 can use both the user profile 204 and the content agreements to select one or more preferred user news stories 106 from the plurality of news stories 202 (e.g., including stories from magazines, newspapers, blogs, and other sources that are indexed using RSS feeds 114, and that may be stored in the news content repository 156). For example, if the user profile 204 identifies a particular news content provider with whom which the operator of the system 100 does not have an appropriate license, the content service 152 may filter or otherwise prevent the news stories published by the particular news content provider from being selected for conversion to audio and for provision in audio newscasts.

The conceptual view of the example system 100 also includes a revenue-generating-content item server 214, a revenue payments processor 216, the natural language prompts repository 109, an audio news report 222 that includes audio 218a-218c and metadata 220a-220c and a metadata index 224, each of which can be used when the system 100 generates an audio news report. For example, the revenue generating-content item server 214 can generate one or more revenue content items that can be added to the audio news report 222. The natural language prompts repository 108 can include one or more natural language prompts that can be added to the audio news report. 222. In one example, the audio 218-218c can be audio created by the text-to-speech converter 122. The metadata 220-220c can be included in the audio news report to assist in the presentation of the audio news report 222. In one example, the metadata 220-220c can include one or more pieces of information each audio news story in the audio news report including the title, the author, the date of publication, or other information that is related to the audio news story. In addition, the metadata 220a-22c can be presented in a user interface, such as a user interface of application 151. The metadata index 224 is a conceptual representation of the metadata for each different item in the audio news report 222. For example, the metadata in the "header" portion of the audio news report 222 is represented by the M1 entry of the metadata index 224.

User profile 204 can include one or more preferences that have been specified by the user. In one example, preferences can be specified explicitly by the user according to information the user provides the system 100 (e.g., language preferences, geographic preferences, topic preferences, news content provider preferences, and other preferences). The user can also specify the preferences implicitly according to certain activities that the user performs using the system 100 or other systems. For example, if a user listens to an entire audio news story, the system may determine that the user prefers some aspect of that audio news story over another audio news story of which the user only listened to a portion or otherwise skipped. As a result, a keyword that was associated by the system 100 with that story may be applied as a keyword for the user, or its weighting with respect to the user may be increased. A similar operation may occur if the user provides a "thumbs up," high star level, or other explicit feedback with respect to the story (and a lower weighting or a higher negative weighting may be provided to a topic if the user expresses a negative implicit or explicit reaction to a story associated with the topic, such as by skipping it soon after it starts ore by providing a "thumbs down" rating to it).

As another example, the system 100 can access various social interactions on a social network to determine topics or other areas of interest that may be useful in determining which news stories to select. That is, some aspects of the user profile 204 can be specified using the activities of the user on one or more social networks 206, previous news selections 208, or information included in the user preferences 210. For example, topics associated with a user's friends in a social network may be inherited by the user, and may be used as topics for matching news stories for a news cast for the user. Similarly, topics in posts made to a social network by the user or the user's friends may be used in selecting stories, or the system 100 may select stories that the user's friends have posted to the social network, so that the user can listen to the stories when listening to their regular newscast, and may be ready to discuss the subjects of such stories with their friends who have read the stories.

As described above, the content service 152 can manage news content and automatically generate audio news reports, such as audio news report 222. For example, the content service 152 can determine the one or more preferred news stories 106 using at least some aspects of the user profile 204, and the content agreements in the content agreement repository 212. Because the news sources may contain substantially similar news content that is substantially duplicated by different authors (e.g., two different source may each run a story about an earnings announcement by a particular company), the system 100 (and in particular the content service 151) can apply one or more text classification heuristics to detect situations in which at least some of the content is duplicated. In one example, where the system 100 detects duplicative content, the system 100 can perform a number of different tasks or operations, including, but not limited to, blending the news content into a single story, remove one of the stories, or summarize all similar stories, e.g., by playing a headline for each story to a user and allowing the user to provide an input while listening to the news cast so as to select one version of the story (e.g., perhaps the user would select the version from a local paper over a national paper). Also, the system 100 may look at by-lines to determine whether two different stories duplicate each other, such as two stories having substantial textual overlap that both list the Associated Press in a by-line.

The particular article or operation selected by the system 100 may depend on the rights afforded the operator of the system 100, as defined by the contents agreement repository 212. For example, a first and third news content providers may agree to allow their respective content to be modified, while a second news content provide may not allow their content to be modified. The system 100 may elect to remove the news story provided by the second news content provider and combine the news stories provided by the first and third news content providers based on the specifics of the particular agreements.

Once one or more preferred user news stories 106 have been selected by the content service 152, the content service 152 can provide the news stories to a text-to-speech converter (e.g., text-to-speech converter 122) to generate one or more respective audio versions (e.g., audio version 218a-218c) of the news stories. In addition, the content service 152 can specify one or more pieces of metadata (e.g., metadata 220a-220c) about the news stories, revenue-generating items, and natural language prompts. The content service 152 may also specify articles that have already been converted to audio, and can specify already-converted articles for some of the articles selected for a particular user's newscast, and can cause other articles to be converted at run-time, such as when the particular user is the first user to have a particular article retrieved for him or her.

The metadata associated with each of the different portions of the audio news report is illustrated by the metadata index 224, which includes metadata entries M1-M9, which correspond to respective sections of the audio news report 222, although the metadata need not be stored in such a data structure. The metadata may include, but is not limited to, the title of the particular portion (e.g., news story, revenue-generating-content item, or natural language prompt) of the audio news report, the author of the particular portion of the audio news report, when the particular portion of the audio news report was published or otherwise created, the length of a particular portion of the audio news report (e.g., either in number of words or in the length of the audio after conversion), a URL from where a news story originated, a URL link that provides addition information about the particular portion of the audio news report, and the number of news stories included in a particular audio news report. In one example, some or all of the metadata may be used to generate a header for the audio news report 222. For example, the header information can be presented as links by the application 151 when a user receives the audio news report. The user can then select any of the links to cause the application 151 to jump to the particular portion of the audio news report identified by the particular link.

The system 100 can also provide portions of the user profile 204 (e.g., keywords) and the topics of the preferred user news stories 106 or URLs where the stories were published, to a revenue-generating-content item server 214. The revenue-generating-content item server 214 may both store the revenue-generating-content items 108 (e.g., by including a revenue-generating-content item repository 107) and determine which of the revenue-generating-content items 108 should be included in the audio news report. In one example, the user's activities on a social media network 206 may suggest that the user enjoys video games, and the system may thus include corresponding advertisements relating to video games (e.g., advertisements for video games, for video game consoles, for alternative music, or for caffeinated beverages) in that user's audio news report. As another example, a user may specify one or more topics for which they would like to receive advertisements, where the topics may be stored in the user preferences 210. The revenue-generating-content item server 214 can select one or more advertisements using the specified topics. As yet another example, the revenue-generating-content items can be generated by analyzing the content of particular ones of the preferred user news stories 106. In one example, the title of a story can be used to generate a search query that is provided to a search engine, e.g., an ad serving search engine. The results of using the search engine may be used to identify a collection of relevant revenue-generating-content items (e.g., comparing a relevancy score to be higher than a certain threshold).

In addition, information in the content agreement repository 212 can be used to refine the selection of one or more revenue-generating items. In one example, click-through rates, bidding information, and other economic metrics can be stored in the revenue content item server 214 and used by the server 214 to determine which of the relevant content items should be selected. For example, revenue-generating-content items that generate more revenue when added to the audio news report may be favored over other content items.

The revenue-generating-content items 108 that are selected by the revenue-generating-content items server 214 can be used to by revenue payments processor 216 to process one or more revenue payments—e.g., to pay a publisher of a story or the publishers of the various stories in a news cast from a payment made by an advertiser whose advertisement was played and/or explicitly responded to by a user. For example, when a revenue-generating-content item is added to an audio news report, the revenue payments processor 216 can process a first amount of revenue to be paid to one or more of the news content providers according to payment information included in the content agreements stored in the content agreements repository 212. Then, if the revenue-generating-content is clicked on or otherwise interacted with by a user during the presentation of the audio news report, the revenue payments processor 216 can process a second amount of revenue to be paid to the one or more news content providers according to the payment information included in the content agreements stored in the content agreements repository 212. Such revenue can be obtained by charging one or more advertisers whose advertisements were presented and/or reacted to.

Figure 3A:
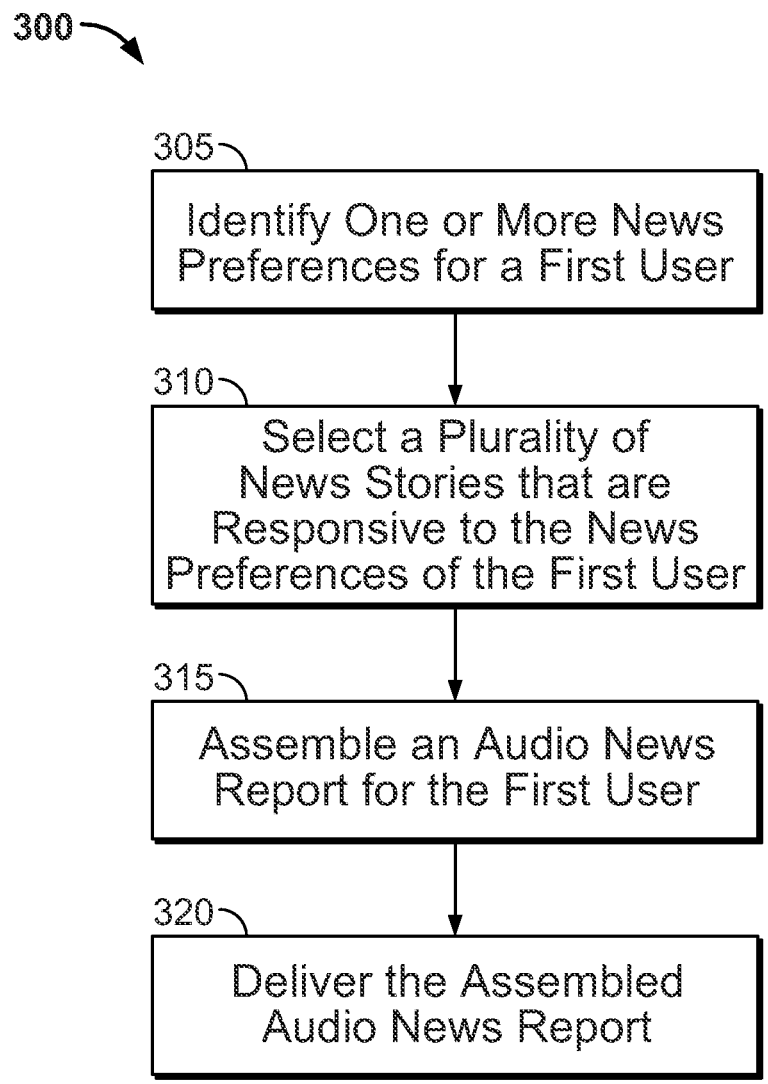
FIG. 3A is a flow chart of an example technique that can be used to generate audio news reports.

FIG. 3A is a flow chart of an example technique 300 that can be used to generate audio news reports. In general, the technique 300 involves building a news report for a user by selecting news stories that are responsive to preferences for the user at least some of the news stories having been converted automatically from text to audio, by selecting advertisements determined to correspond to preferences of the user, to the news stories or topics of the news stories, or both, and by selecting bumper material to provide for smooth transitions between the other components of the new program. The technique is described in reference to system 100 (e.g., as shown in FIGS. 1A, 1B, and 2), although other systems may be configured to perform technique 300. In one example, the technique 300 can be performed in response to receiving an audio news report request from the computing device 158. In another example, the technique 300 can be performed automatically and continuously to generate one or more audio news reports that can be sent to a first user according to some combination of the first user's preferences and the first user's manual request for an audio news report.

In step 305, the system 100 can identify one or more news preferences for a first user. For example, the system 100 can access user profile 204 of the first user stored in the user preferences repository 104. In one example, the user profile 204 can include a combination of news topics and news providers preselected by the first user. The user profile 204 can also include information that corresponds to activities performed by the first user on one or more social networks 206. The user profile 204 can also include information that corresponds to activities performed by users other than the first on one or more social networks 206. For example, an acquaintance of the first user may suggest a news story that may interest the first user. The system 100 can use any combination of the preselected news topics and news providers, the information that corresponds to activities performed by the first user on one or more social networks 206, and the information that corresponds to activities performed by users other than the first user to identify the one or more news preferences for the first user.

In step 310, the system 100 can select a plurality of news stories that are responsive to the news preferences for the first user, where the news stories can include audio versions of stories that have been converted automatically from textual news stories. In one example, the system 100 may have automatically converted text versions of the news stories into respective audio versions using text-to-speech converter 122 at some earlier time. In another example, the system 100 may provide the textual news stories to text-to-speech converter 122 during the execution of the technique 300.

In step 315, the system 100 can assemble an audio news report for the first user, where the report includes the audio versions of the selected news stories. In one example, the system 100 may also select one or more revenue-generating-content items 108, where the revenue-generating-content items can be in an audio format and can correspond to the selected news stories, to aspects of the first user, or both. Aspects of the first user can include the information included in the user profile 204, such as preselected user preferences and identified social networking activity. Likewise, the system 100 may select one or more natural language prompts 110 for at least one of the selected news stories that are also included in the audio news report.

In step 320, the system 100 can deliver the assembled audio news report to a device such as computing device 158. In one example, the system 100 can deliver the audio news report through an application such as application 151. As another example, the system 100 can deliver a file corresponding to the audio news report that can be played on the mobile device using an application that is executed locally on the mobile device, such as a general music player that is capable of managing various audio sources including podcasts and similar audio sources.

Figure 3B:
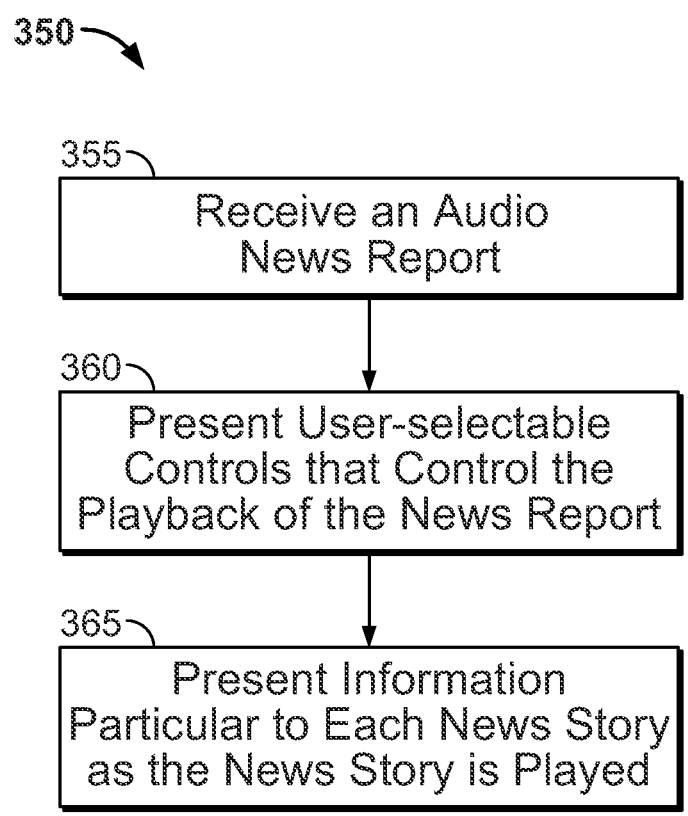
FIG. 3B is a flow chart of an example technique for presenting an audio news report on a computing device.

FIG. 3B is a flow chart of an example technique 350 for presenting an audio news report on a computing device. In general, the technique 350 involves actions that occur on a client device in the process of playing an audio news cast that has been prepared in manners like those discussed above. The technique is described in reference to computing device 158, although other devices may be configured to perform technique 350. In one example, the technique 350 can be performed in response to the computing device 158 receiving a user-initiated request for the audio news report, generating an audio news report request, and transmitting the audio news report request to system 100. In another example, the technique 350 can be performed when the computing device 158 receives a notification from the system 100 that a new audio news report is available.

In step 355, the computing device 158 can receive an audio news report that includes one or more audio news stories that have been automatically converted from respective text versions. For example, the computing device 158 can receive an audio news report that has been generated by the system 100 performing technique 300.

In step 360, the computing device 158 can present on a display device, user-selectable controls that control the playback of the audio news report. In one example, user-selectable controls can include play, pause, and stop controls. In addition, the controls can include one or more links for the news stories that when selected by the user, which may cause the computing device 158 to jump to a point in the audio news report that contains news story associated with the selected link.

In step 365, the computing device 158 can present, on the display device, information particular to each of the news stories as each news story is played. In one example, presenting the information can include identifying a title for each of the news stories in the audio news report, generating user-selectable links that correspond to the titles of each of the news stories, where the user-selectable links present the user with information about the source of the news story upon selection, and presenting the user-selectable links. Links can also be associated with one or more revenue-generating-content items, and when selected, may cause the computing device 158 to navigate to a web site that includes more information about the offer included in the revenue-generating-content item (e.g., specifics about the product, the promotion, or other information).

Figure 4A:
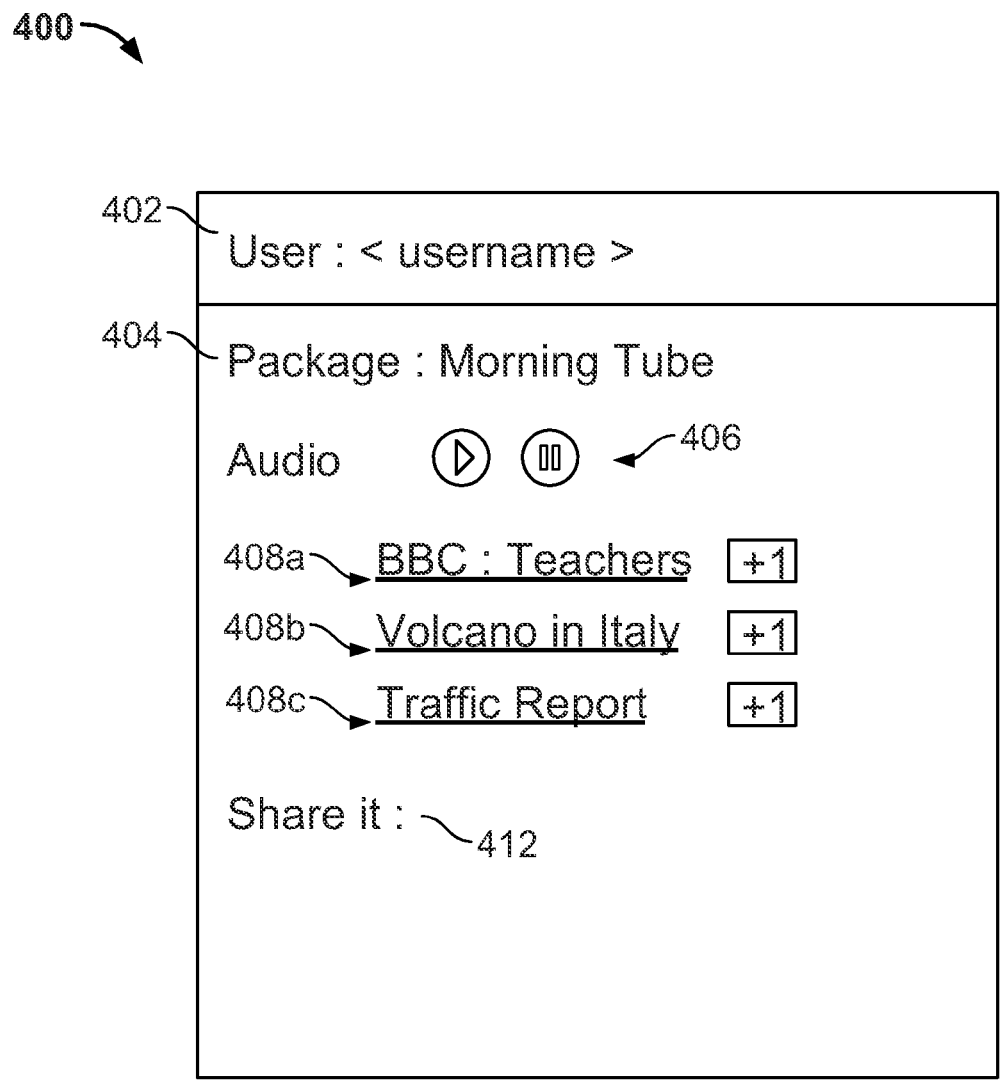
FIG. 4A shows an example user interface that presents information about an audio news report.

FIG. 4A shows an example user interface 400 that presents information about an audio news report. In one example, the user interface 400 is presented as part of interacting with application 151. That is, a user can connect to the system 100 using an HTML-enable browser on the computing device 158 that communicates with application 151. The user interface may include a region 402 for the user's username, a region 404 that specifies the particular package used to create the audio news report, and region 406 that includes one or more user-selectable controls.

The user interface 400 can also be used to show a summary of the contents of the audio news report and include links 408a-408c to the original news sources (e.g., web pages maintained by the news content providers). In one example, if the user selects one of the links 408a-408c, the application 151 can navigate the link and present a web site or other document referenced by the link's URL. The user interface 400 can also provide user interface components 410a-410c that if selected, indicates that the user approves of some aspect of the particular news story. In one example, by selecting any of the "+1" icons 410a-410c, the application 400 can access the user profile 204 of the particular user and update one or more user preferences according to the news story associated with the selected icon 410a-410c. For example, if the user selects icon 410b associated with the "Volcano in Italy" story the application 400 can access the user profile 204 and add or a value corresponding to "volcano" and "Italy" in the user's preferred list of topics. If, for example, the topics "volcano" or "Italy" are already represented in the user's preferred list of topics, a value corresponding to the particular topics can be incremented to indicate that the user has previously approved of the selected topic or topics. Such an approach can further refine the user's likes and dislikes or time.

The user interface 400 also includes a link 412 that can be used to share the audio news report with others. In one example, the audio news report can be shared with other users of the system 100. In another example, the audio news report can be shared with the user's acquaintances on a social media network. The link 412 can also be used to update the user profile 204. For example, when a user selects the link 412, the user profile 204 can be updated to reflect the fact that the user shared the audio news report. Furthermore, the news topics and news content providers can be identified and stored in the user profile 204. Such an approach can further refine the user's likes and dislikes or time.

Figure 4B:
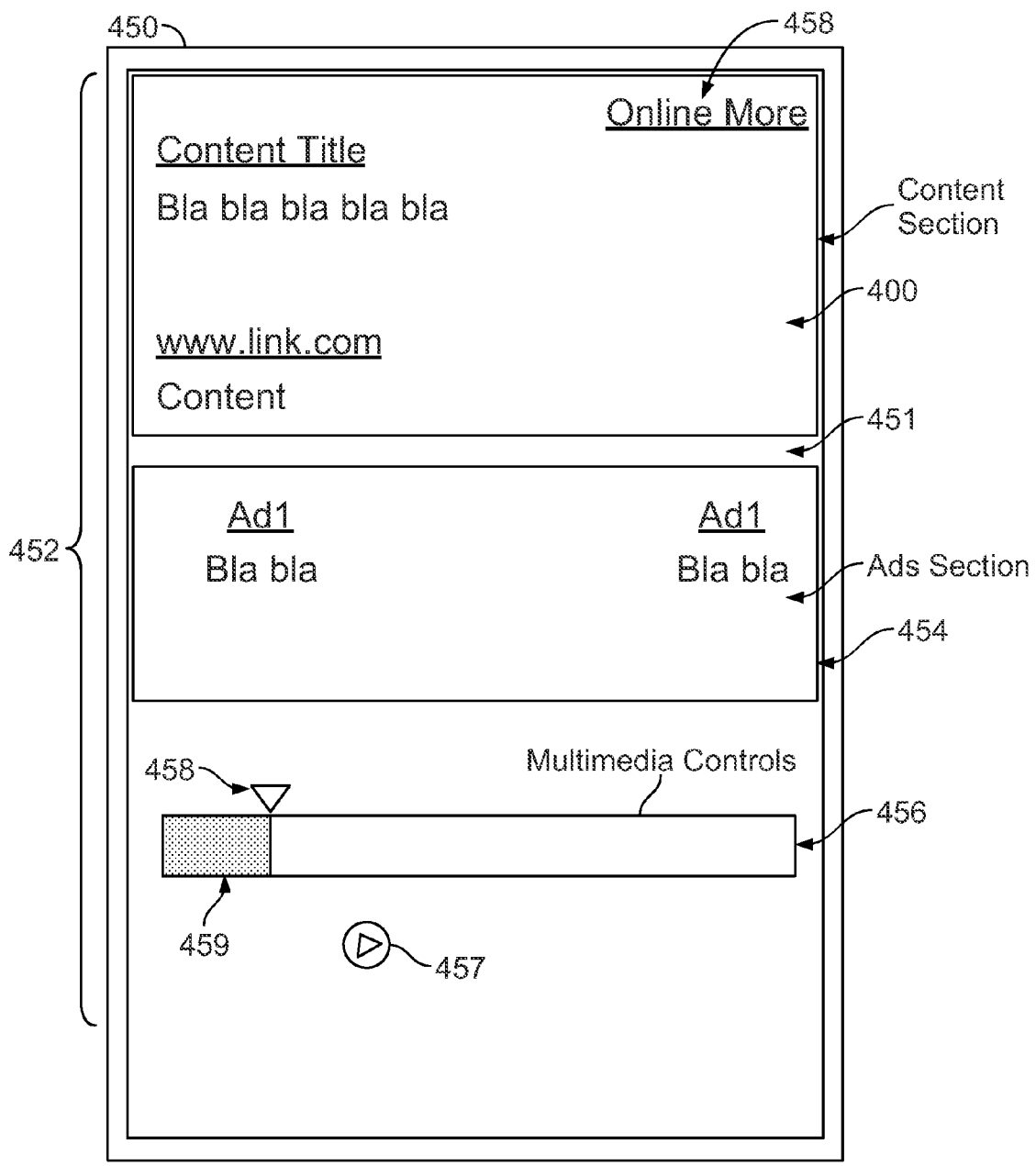
FIG. 4B shows an example mobile device executing an application that can present an audio news report.

FIG. 4B shows an example mobile device 450 executing an application 452 that can present an audio news report. In one example, the mobile device 450 is the computing device 158 described above. In one example, the application 452 can be an application resident on the mobile device (e.g., a web browser or other application). For example, the application 452 may be programmed to present audio news reports in a user interface region 451 that presents user interface 400. The application 452 may be programmed to present a user interface region 454 that includes the one or more revenue-generating-content items 108. The application 452 may also be programmed to present user-selectable controls, such as multimedia controls 456 that allow the user to control the manner in which the audio news reports are presented. For example, the multimedia controls 456 may include a "play" button 457, which while the audio news report is playing changes to a "pause" button (not shown). The multimedia controls 456 may also include a slider 458 that can be used to jump forward or backward along the audio news report timeline 459.

In one example, the application 452 can be programmed to allow the user to retrieve audio news reports from the system 100, change user settings and preferences (e.g., by making modifications to one or more user preferences 210), present the audio news reports, display the links to the stories included in the audio news report, and display links to the advertisements included in the audio news reports. For example, when a user selects a link associated with a particular story included in the user interface 400 that is presented in user interface region 451 or a link associated with a revenue-generating-content item included in the user interface region 454, the application 452 may navigate to a web page or other source that provides more detailed information about the link. That is, the application 452 can include one or more links to that are generally responsive to user interaction, such that when a user selects a link, the application 452 can navigate to some combination of the source of the story or content item or more information about the story or content item based on the URL specified by the link.

The application 452 can also operate in both offline and online modes, and the application many include a corresponding offline or online indicator 458. When offline, clicks on the revenue-generating-content items present in user interface region 454 are stored for later processing once the mobile device is able to connect to a network. The application also provides information to the user based on the news story being recited. For example, the application 452 can present the title of the story, a link to the story, and other information in user interface region 400.

In one example, the application 452 may allow a user to store the audio news reports on a computer-readable storage device included in the computer device 158. The application 452 may also allow a user to remove one or more audio news reports stored on the computer-readable storage device. Also, the application may allow the sharing of audio news reports thorough, e.g., social networking interactions or peer-to-peer sharing (e.g., by selecting the link 412 presented in the user interface 400 presented in user interface region 451).

Figure 5:
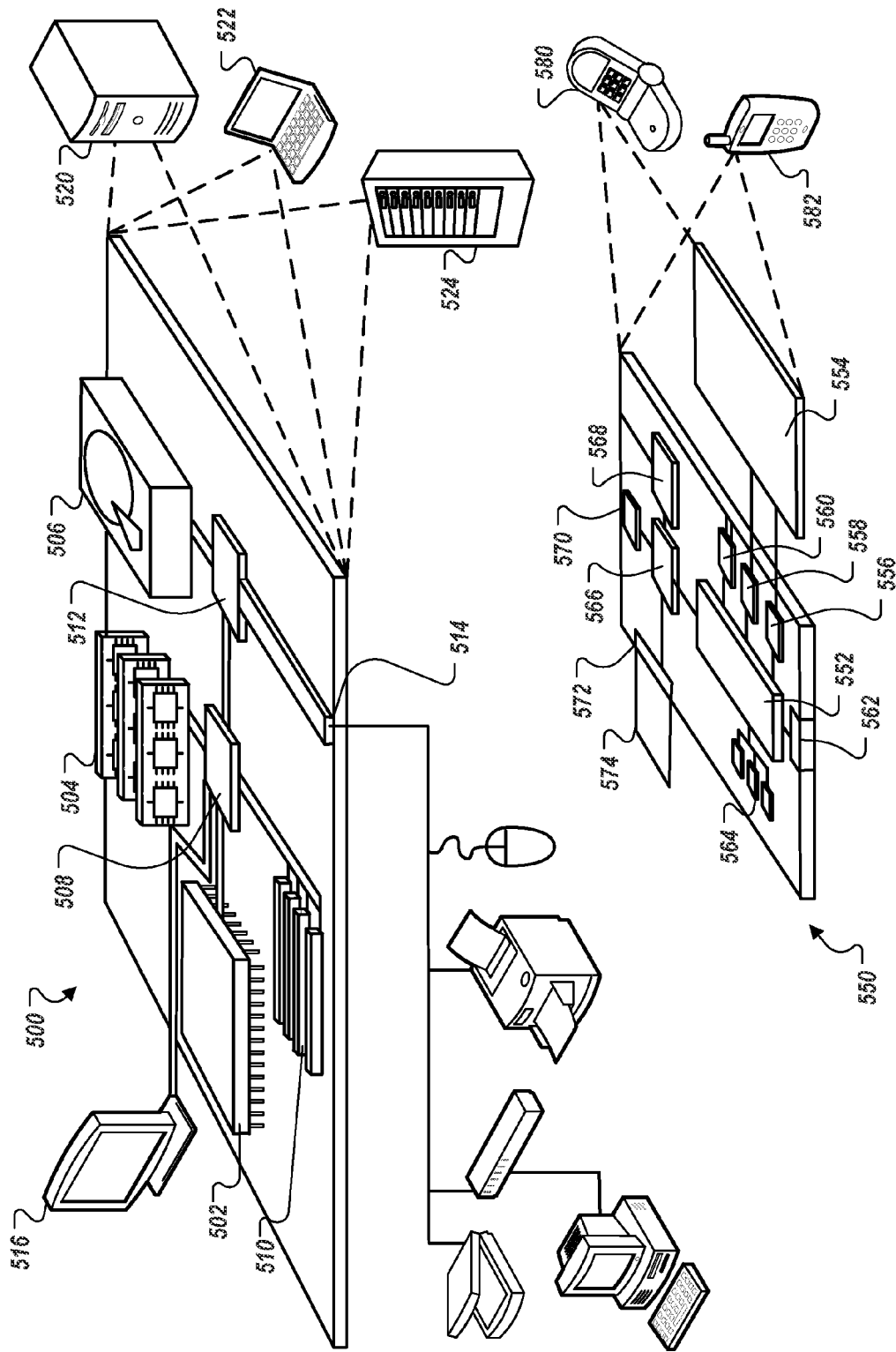
FIG. 5 shows an example computer system that can be used to implement systems and techniques described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   identifying, with a computer system, one or more news preferences for a first user;
   selecting a plurality of news stories, wherein particular ones of the new stories are determined to be responsive to the news preferences for the first user and comprise audio versions of stories converted automatically from textual news stories;
   assembling, with the computer system and for the first user, an audio news report that includes the audio versions of the selected news stories;
   selecting one or more items of promotional information, the items of promotional information being in an audio format and that are selected to correspond to topics of the selected news stories, to preferences of the first user, or both; and
   delivering, to a computing device, the assembled audio news report,
   wherein the assembled audio news report further includes the selected items of promotional information,
   wherein selecting the one or more items of promotional information comprises:
   generating search results for a search query that includes text that is determined to correspond to one or more titles of the selected news stories;
   identifying one or more items of promotional information from the results of executing the search query and previously provided bidding information provided by an advertiser; and
   in response, using the one or more identified items of promotional information as the selected items of promotional information.

2. The computer-implemented method of claim 1, wherein identifying the news preferences comprises:
   accessing a user profile of the first user, the user profile including a combination of news topics and news providers preselected by the first user; and
   using the preselected news topics and news providers to identify the one or more news preferences for the first user.

3. The computer-implemented method of claim 2, wherein the user profile further includes information that corresponds to activities performed by the first user on one or more social networks, and
   identifying news preferences further comprises using the information to determine one or more news preferences for the first user.

4. The computer-implemented method of claim 2, wherein the user profile further includes information that corresponds to activities performed by users other than the first user on one or more social networks, and
   identifying news preferences further comprises using the information to determine one or more news preferences for the first user.

5. The computer-implemented method of claim 1, wherein selecting the one or more items of promotional information comprises:
   determining the content of at least one of the news stories;
   identifying one or more items of promotional information based on a similarity between the content of the news stories and the content of the items of promotional information; and
   in response, using the one or more identified items of promotional information as the selected items of promotional information.

6. The computer-implemented method of claim 1, wherein the assembled news report further includes audio that corresponds to spoken news retrieved from a news provider.

7. The computer-implemented method of claim 1, wherein the one or more items of promotional information are further presented with user-selectable content that causes an application that is executed on the mobile device to present additional information about the items of promotional information.

8. The computer-implemented method of claim 1, further comprising:
   accessing agreement information that corresponds to agreements entered into by each owner of a news story in the plurality of news stories, wherein selecting a plurality of news stories further comprises preventing one or more news stories from being selected based on the agreement information.

9. The computer-implemented method of claim 8, wherein the agreement information comprises at least one of a revenue sharing requirement, an article modification requirement, an attribution of source requirement, and click-through behavior for the one or more items of promotional information.

10. The computer implemented method of claim 1, wherein selecting the plurality of news stories is influenced by the geographic location of the first user.

11. The computer implemented method of claim 1, wherein a length of the audio news report is selected to correspond to the news preferences for the first user.

12. A computer-implemented method comprising:
    identifying, with a computer system, one or more news preferences for a first user;
    selecting a plurality of news stories, wherein particular ones of the new stories are determined to be responsive to the news preferences for the first user and comprise audio versions of stories converted automatically from textual news stories;
    assembling, with the computer system and for the first user, an audio news report that includes the audio versions of the selected news stories;

selecting, for at least one of the selected news stories, one or more natural language prompts that play audio as part of the audio news report separate from the news stories; and delivering, to a computing device, the assembled audio news report, wherein the assembled audio news report further includes the selected natural language prompts, wherein selecting one or more natural language prompts comprises:

determining the absence, for at least one of the selected news stories, of an audio version of a natural language prompt stored on a computer-readable storage device;

generating one or more text prompts that correspond to the audio version;

providing the text transitions to a text-to-speech converter for conversion into respective audio formats;

storing the respective audio formats on the computer-readable storage device; and in response, using the respective audio formats as the selected natural language prompts.

13. The computer-implemented method of claim 12, wherein selecting one or more natural language prompts comprises:

detecting, for at least one of the selected news stories, the presence of one or more audio versions stored on a computer-readable storage device, where the audio versions correspond to the one or more natural language prompts;

retrieving the detected audio versions from the computer-readable storage device; and in response, using the retrieved audio versions as the selected natural language prompts.

14. The computer-implemented method of claim 12, wherein the selected natural language prompts are arranged within the audio news report to signal a transition between at least one of the selected news stories.

15. One or more machine-readable tangible storage devices storing instructions that, when executed by one or more computer processors, perform operations comprising:

receiving, on a computing device, an audio news report that includes one or more audio news stories that have been automatically converted from respective text versions and selected one or more items of promotional information, wherein the selected one or more items of promotional information were selected by:

generating search results for a search query that includes text that is determined to correspond to one or more titles of the selected news stories;

identifying one or more items of promotional information from the results of executing the search query and previously provided bidding information provided by an advertiser; and in response, using the one or more identified items of promotional information as the selected items of promotional information;

presenting, on a display device of the computing device, user-selectable controls that control the playback of the audio news report; and presenting, on the display device, information particular to each of the news stories included in the audio news report as each news story is played.

16. The machine-readable storage devices of claim 15, wherein presenting information particular to each of the news stories comprises:

identifying a title for each of the news stories in the audio news report;

generating user-selectable links that correspond to the titles of each of the news stories, where the user-selectable links present the user with information about the source of the news story upon selection; and presenting the user-selectable links.

17. The computer implemented method of claim 15, wherein receiving the audio news report is in response to receiving a user-initiated request for the audio news report, generating an audio news report request, and transmitting the audio news report request to a server system.

18. A system comprising:

one or more processors;

a user profile repository that stores a plurality of user profiles, where each user profile in the plurality of user profiles includes one or more news preferences;

a content service is programmed to select one or more news stories for a first user, wherein the selected news stories are responsive to the news preferences included in a user profile in the plurality of the user profiles for the first user, wherein the content service is further programmed to select one or more items of promotional information, the items of promotional information being selected to correspond to topics of the selected news stories, to preferences of the first user, or both, wherein the selected one or more items of promotional information are selected by:

generating search results for a search query that includes text that is determined to correspond to one or more titles of the selected news stories;

identifying one or more items of promotional information from the results of executing the search query and previously provided bidding information provided by an advertiser; and in response, using the one or more identified items of promotional information as the selected items of promotional information;

a text-to-speech converter that is programmed to automatically convert the selected news stories into a respective audio version;

an audio assembler that is programmed to assemble an audio news report for the first user that includes the audio versions of the selected news stories; and a delivery interface that is programmed to deliver the audio news report to a mobile device operated by the first user.

* * * * *